Nov. 13, 1945.  V. WEBER  2,389,014
TEMPERATURE REGULATING DEVICE
Filed June 20, 1941  3 Sheets-Sheet 2
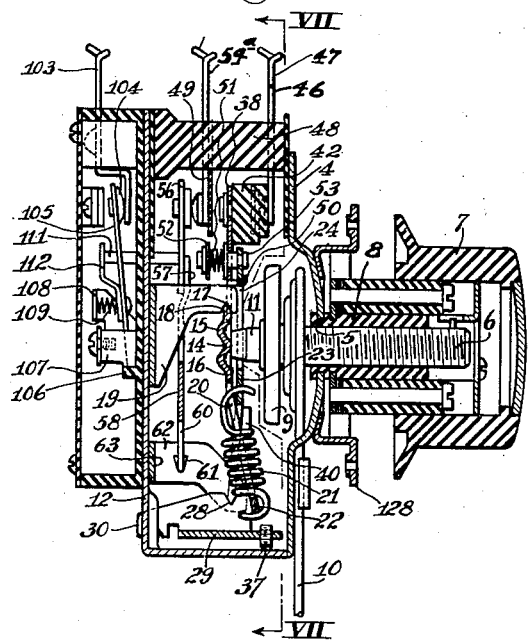
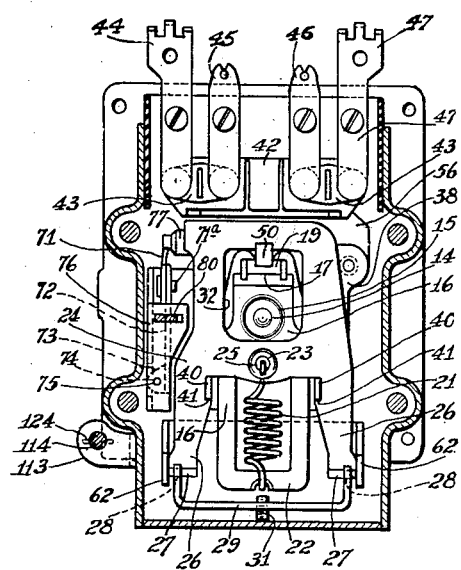
INVENTOR.
VICTOR WEBER
BY Albert J. Henderson
ATTORNEY.

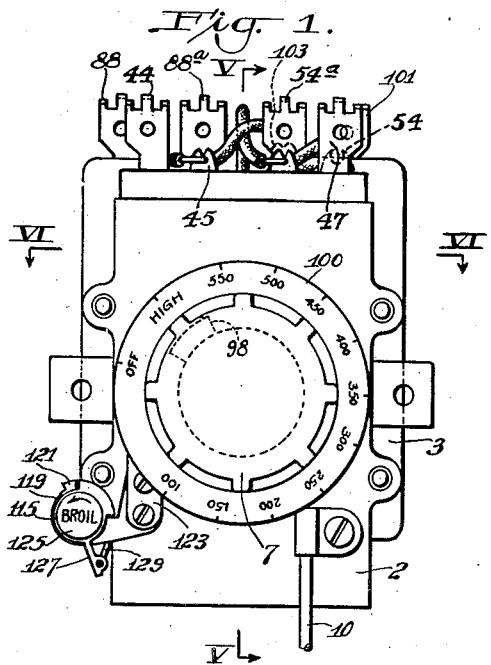
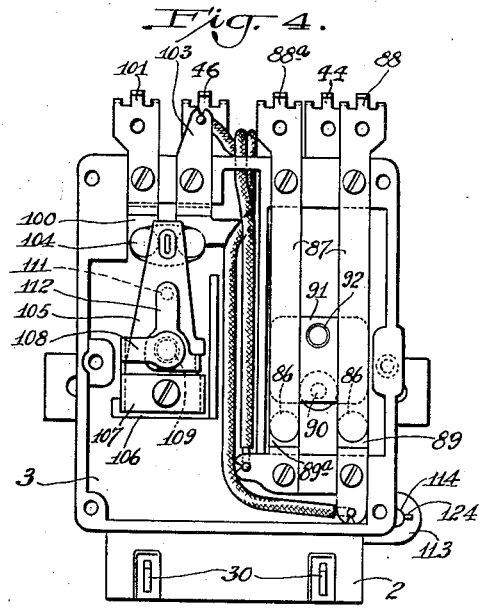
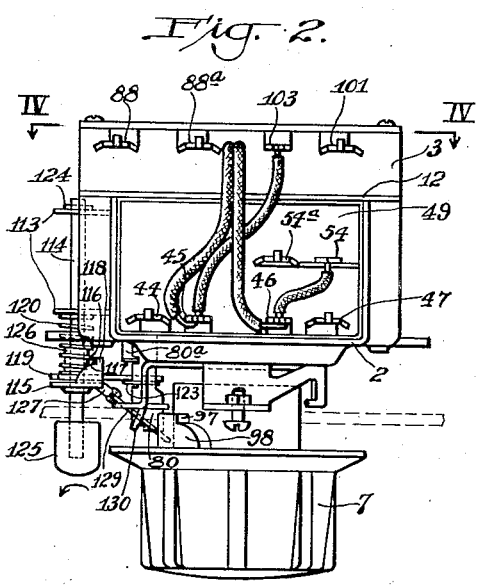
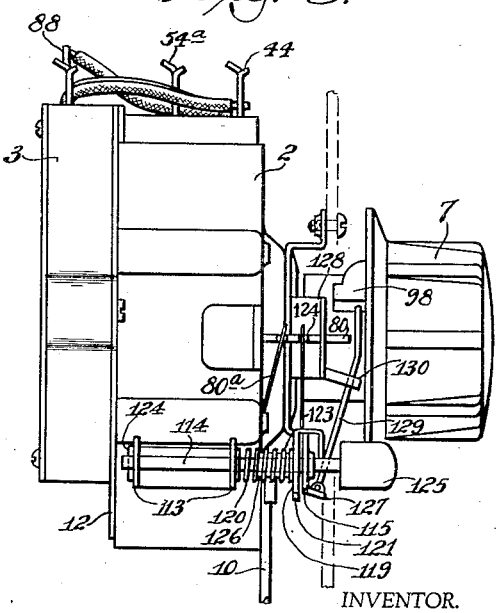

Nov. 13, 1945.  V. WEBER  2,389,014
TEMPERATURE REGULATING DEVICE
Filed June 20, 1941  3 Sheets-Sheet 3
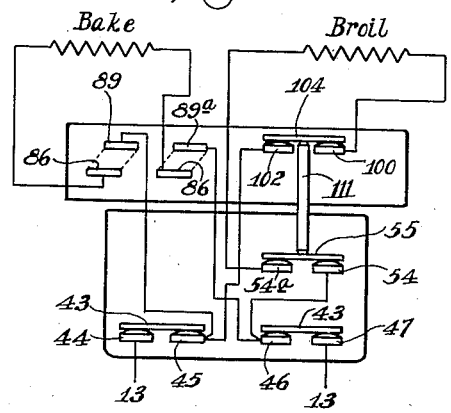
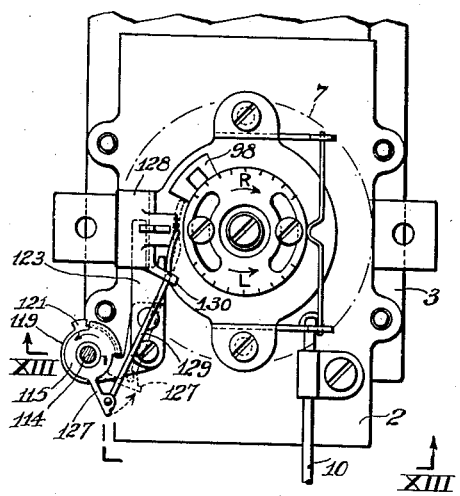
INVENTOR.
VICTOR WEBER.
BY Albert J. Henderson
ATTORNEY.

Patented Nov. 13, 1945

2,389,014

UNITED STATES PATENT OFFICE 2,389,014

TEMPERATURE REGULATING DEVICE

Victor Weber, Greensburg, Pa., assignor to Robertshaw Thermostat Company, Youngwood, Pa., a corporation of Pennsylvania Application June 20, 1941, Serial No. 398,955

6 Claims. (Cl. 219—20)

This invention relates to temperature regulating devices and, more particularly, to thermostatically actuated devices for regulating the supply of heat to electric ovens and the like.

The ordinary electric range is provided with an element in the lower portion of the oven which is used primarily for baking purposes, and an element in the upper portion of the oven used primarily for broiling purposes. Thermostatic regulating devices have been provided to connect both elements simultaneously to a current source for preheating the oven and then automatically to disconnect the broiling element for conducting a baking operation. Such an arrangement is disclosed in my copending applications, Serial Nos. 247,390 and 323,162, now Patent Nos. 2,385,433 and 2,385,434, respectively.

In the structures described and shown in these applications a preheating operation followed by a baking operation can be conducted by manually operating the adjusting means by rotating its dial to connect both the broil and the bake elements to the line and immediately thereafter rotating the dial in a reverse direction to the desired baking temperature. If it is desired to conduct a baking operation without preheating, the dial is merely rotated to the desired baking temperature. If broiling alone is to be conducted then the dial is rotated to the highest temperature setting or broil position.

While this arrangement provides control of baking and broiling operations, together with rapid heating when desired, it is sometimes desirable to conduct a broiling operation at a lower temperature than is possible with the arrangement described. Thus, food may be required to be broiled by operation of the oven at any set temperature within the high and low limits of such an operation. Also, food which has been subjected to a baking operation may subsequently be exposed to the heat of the broiling element for final cooking purposes while the oven remains at the baking temperature or is operated at any other selected temperature.

It is an object of this invention to permit broiling operations to be conducted at any desired temperature while also providing for the rapid preheating of the oven following by a baking operation with a single setting of the control dial.

Another object of the invention is to permit both baking and broiling operations to be conducted at any desired temperature.

Another object of the invention is to reset the oven regulating device automatically to a set operating position whenever the dial is turned to an off position.

Other objects and advantages will become apparent from the following description taken in connection with the accompanying drawings, wherein—

Fig. 1 is a front elevation of the temperature regulating device;

Fig. 2 is a top plan view of the structure shown in Fig. 1;

Fig. 3 is a side elevation of the structure shown in Fig. 1;

Fig. 4 is a section taken along the line IV—IV of Fig. 2 looking in the direction indicated by the arrows;

Fig. 5 is a section taken along the line V—V of Fig. 1 looking in the direction indicated by the arrows;

Fig. 6 is a section taken along the line VI—VI of Fig. 1 looking in the direction indicated by the arrows;

Fig. 7 is a section taken along the line VII—VII of Fig. 5 looking in the direction indicated by the arrows;

Fig. 8 is a section taken along the line VIII—VIII of Fig. 6 looking in the direction indicated by the arrows;

Fig. 9 is a wiring diagram showing the electrical connections for the structure;

Fig. 10 is a side view of the adjust dial;

Fig. 11 is a front elevation of the adjusting dial shown in Fig. 10.

Fig. 12 is a front view similar to Fig. 1 but with the dial removed;

Fig. 13 is a section taken on the line XIII—XIII of Fig. 12 looking in the direction indicated by the arrows; and Fig. 14 is a perspective view of the parts shown in section in Fig. 13.

In the embodiment shown in the drawings, the operating levers of the regulating device are mounted in a main housing 2 and in a rear housing 3 which is carried by the main housing 2. The front cover 4 of the main housing has an opening 5 through which a screw 6 extends. This screw cooperates with an adjusting dial 7 for adjusting the device and for setting the various switch elements so as to operate in the desired manner.

The adjusting screw 6 is supported in a bushing 8 which is rigidly secured to the front cover 4. This bushing is interiorly threaded for cooperation with the adjusting screw 6 so that the screw will move inwardly or outwardly as it is rotated by the adjusting dial 7. The inner end of the screw engages the usual stud attached to an expansible and contractible diaphragm 9 to support and move the diaphragm.

The interior of the diaphragm 9 is in communication with a capillary tube 10 which, in turn, is in communication with the interior of the temperature sensitive bulb (not shown) which is positioned in the oven or other chamber, the temperature of which is to be controlled. A contractible and expansible liquid is provided in the bulb and the capillary tube 10 so that upon expansion of the liquid as a result of the heat to which the bulb is subjected, the liquid will be forced through the tube into the expansible and contractible diaphragm 9, thereby actuating the diaphragm to a sufficient extent to operate the parts to be described for shutting off or turning on the supply of current to the oven. A tip 11 is provided on the face of the diaphragm opposite the stud to facilitate the transmission of the expansive forces of the diaphragm to the parts to be described.

The tip 11 abuts a button 14 in the recessed portion 15 of a main operating lever 16. The operating lever 16 has a knife edge 17 at its upper end seated in V-shaped bearings 18 in a bracket 19 which is secured to the rear wall 12 of the main housing.

The lower end of the main operating lever 16 is U-shaped to provide a space between its legs 20 for the reception of a tension spring 21. The lower end of the main operating lever is provided with a knife edge 22 which cooperates with one end of the tension spring 21. The upper end of the tension spring 21 extends through an opening 23 in an R-shaped secondary operating lever or contact arm 24. The opening 23 is provided with a knife edge 25 for cooperation with the spring, so that there will be relatively little or no friction to affect the operation of the structure.

Each leg 26 of the secondary lever or contact arm 24 has a knife edge 27. The knife edges 27 rest in V-shaped bearings 28 formed in a bracket 29. The rear end of the bracket 29 is provided with arms 30 which extend slightly through and are supported by the rear wall 12 of the main housing. The front end of the bracket 29 is provided with a screw 31, the bottom end of which rests on the bottom of the main housing. This screw can be threaded through the bracket so as to raise or lower it and thereby effect an adjustment of the operating range of the levers. The secondary lever 24 is provided with an opening 32 so as to permit the tip 11 carried by the diaphragm to extend past it and to contact the button 14 carried by the main operating lever.

A take-up arm 38 of inverted U-shape in general configuration is provided for cooperation with the secondary lever or contact arm 24. The legs 39 of the take-up arm are provided at their lower ends with projections or bearings 40 which extend outwardly from the general plane of the take-up arm and rest on inwardly projecting ledges or bearings 41 formed on the contact arm 24. The upper end of the take-up arm 38 extends above the upper end of the contact arm 24 and carries an insulating bar 42. This insulating bar is mounted on the upper end of the take-up arm in such a way as to permit a slight pivoting in a horizontal plane to facilitate the alinement of contact bridges 43, which are carried by the insulating bar. The contact bridges 43 cooperate with the contacts 44, 45, 46 and 47 which are supported on an insulating block 48 carried by the rear wall 12 of the main housing. The contacts 44 and 47 are connected to a source of power through the lines 13 as shown in Fig. 9. The block 48 also supports an insulating plate 49 which extends downwardly behind the take-up arm 38 and limits the movement thereof in a contact breaking direction.

The take-up arm 38 is provided with a hook 50 which extends around the underside of the top cross-piece of the R-shaped contact arm 24. This hook 50 limits the movement of the take-up arm in respect to the contact arm 24. A spring 51 normally urges the take-up arm toward the contact arm. One end of the spring abuts the rear face of the take-up arm and the other end abuts a washer 52 on a stud 53 projecting from the upper end of the contact arm.

It will be seen from the above description that, as the liquid in the bulb and in the capillary tube 10 expands in response to the temperatures prevailing in the oven, the diaphragm 9 will expand and will force the lower end of the thermostatically actuated lever 16 past the pivot point of the contact arm 24. Due to the spring tension the contact arm and the take-up arm will be moved to the left as viewed in Fig. 5, thus breaking the contact between the contact bridges 43 and the contacts 44, 45, 46 and 47 to interrupt the flow of current from the power lines 13.

So long as the diaphragm 9 remains in the expanded position, the current will be interrupted, but upon cooling down of the oven the diaphragm will contract and, as soon as the lower end of the lever 16 passes the pivot point in the other direction, the contact arm 24 and the take-up arm will be moved to the right as viewed in Fig. 5, and the current will again be permitted to pass through the contacts.

Contacts 54 and 54a are mounted on the insulation plate 49 and connected in the circuit of the broil element to be bridged by contact bridge 55. The bridge 55 is carried on an insulated extension 56 of arm 57 of a broil lever 58. The broil lever 58 is H-shaped in general configuration and is provided with an arm 57 and another upstanding arm 59. It is also provided with leg portions 60 which are pivotally mounted in openings 61 in the forwardly extending legs 62 of a bracket 63 secured to the rear wall 12 of the main housing. The legs 62 extend horizontally beyond the openings 61 and beyond the legs of the broil lever 58 and their outer ends are positioned adjacent the legs 26 of the contact arm 24. In this manner, the legs 26 are prevented from sliding laterally out of the bearings 28.

The arm 59 of the broil lever is provided with a tapered depression 65 which cooperates with a cone-shaped disk 66. One end of a spring 67 abuts the disk 66 and the other end of this spring carries a similar disk 68 which cooperates with a depression 69 in a bracket 70 carried by the rear wall of the main housing. The spring 67 is normally under compression and, consequently, will maintain the broil lever 58 in any position to which it is moved on either side of the pivot on which it is mounted. When the upper end of the broil lever is moved past the pivot point to the right, as viewed in Fig. 5, the spring arrangement just described will operate to snap the contact bridge 55 into engagement with the contacts 54 and 54a so as to permit current to pass to the broil element. If the broil lever is moved to the left, as viewed in Fig. 5, a sufficient distance to pass the pivot point then the spring arrangement will serve to hold the broil lever away from the contacts 54 and 54a, thus maintaining in an interrupted state the electric circuit leading to the broil element.

The broil lever and the contact arm are operatively connected together in such a manner that the broil lever may or may not be affected by the operation of the contact arm, as desired. Suitable connections are also provided between the dial and the switch mechanism to permit manual setting of the switches and thermostatic actuation thereof in any desired manner, as will now be explained.

An operating link 71 is pivotally mounted on a resetting link 72 at 71a. The resetting link 72 is provided with horizontally extending arms 73 which are provided with openings 74 cooperating with a pivot pin 75 carried by a bracket 76 which, in turn, is carried by the rear wall 12 of the main housing. The operating link 71 is provided with laterally extending spaced arms 77 normally extending between the broil lever 58 and the contact arm 24. The resetting link 72 is normally forced toward the contact arm and the broil lever by a spring 79, one end of which abuts the bracket 76. The distance between the arms 77 of the operating link is approximately the same as the distance between the adjacent faces of the contact arm 24 and the broil lever 58 when the contact bridges 43 and 55 engage their respective contacts.

If the broil lever is in the position where the contact bridge therefor engages its contacts and the temperature in the oven reaches the desired setting, the movement of the contact arm 24 causing movement of the main bridges 43 away from their respective contacts will also operate, through the operating link 71, to move the broil lever to a position where the contact arm carried thereby is disengaged from the contacts 54 and 54a. The broil lever 58 will then remain in that position until manually moved into engagement with its contacts.

The broil lever is manually moved into a position to establish the broil circuit by means of the resetting link 72 and a reciprocable member in the form of an operating bar 80. The resetting link 72 has a horizontally extending arm 81 thereon which is adapted to cooperate with a cup-shaped projection 82 carried on the rear face of arm 59 of the broil lever. As the resetting link is rocked on its pivot the arm 81 engages the cup-shaped projection 82 and slides along the face thereof to force the broil lever into its forward position where the contact bridge 55 engages the contacts. The resetting link is further provided with an ear 83 which cooperates with a sloping surface 84 on the operating bar 80. As this bar is pushed inwardly, by rotation of the dial, the face 84 slides over the ear 83 and rocks the resetting link on its pivot, thereby forcing the broil lever forward. By virtue of the toggle arrangement described above, the broil lever will remain in this position until moved therefrom.

If the operating bar 80 is held in, as described, the resetting link 72 and the operating link 71 carried thereby will be held in their outer position. In this position the terminal end portions of the arms 77 of the operating link will still be between the contact arm 24 and the arm 59 of the broil lever, the arms of the operating link being made sufficiently long for this purpose. In this position, the contact arm 24 can be actuated by the diaphragm and the actuating lever without moving the broil lever from closed position. The terminal ends of the arms 77 of the operating link are spaced sufficiently far apart to permit movement of the contact arm without corresponding movement of the broil lever. The contact arm can therefore be actuated so as to break the circuit without disturbing the contact between the bridge 55 and the contacts 54 and 54a.

If the operating bar 80 is released after having been pushed in so as to move the broil lever into contact position, the spring 79 will force the resetting link, the bar 80 and the operating link 71 back into normal position. A flat spring 80a extends from the outer surface of the housing into a slot formed in the bar 80 and assists in returning it to normal position. If the diaphragm thereafter moves the contact arm 24 in response to an increase in temperature the movement of the contact arm will cause the broil lever 58 to move in a direction to disengage bridge 55 from contacts 54 and 54a and thus break the broil circuit.

The rear housing 3 contains the contacts for the bake element circuit. As shown in Fig. 4, contacts 86 are mounted on contact arms 87 connected with terminals 88 and 88a extending from the rear housing. The contacts 86 cooperate with contacts 89 and 89a which are carried by the rear housing and which, through appropriate connections to be described hereinafter, are connected to the contacts 45 and 46 which are connected to the power source through the contact bridges 43. The contacts 86 are normally in contact with the contacts 89 and 89a. When it is desired to separate these contacts they are moved manually apart in a manner to be described.

The end of the operating arm 80 engages a pin 90 extending from the main housing into the rear housing. The other end of the pin 90 engages an insulating block 91 which bears against the arms 87. This insulating block 91 is loosely supported on an insulating pin 92 carried by the rear housing. As the arm 80 is moved rearwardly it moves the pin 90 rearwardly and effects a separation of the contacts so that, regardless of whether the contact bridges 43 are in engagement with their respective contacts, no current will flow to the bake element. This condition prevails only when the adjusting dial 7 is turned to the "high" position at which the operating arm 80 is moved rearwardly or when the arm 80 is otherwise moved rearwardly. When the dial 7 is turned to the "high" position a cam member 98, which is carried on the rear face of the dial, cooperates with the operating bar or arm 80 and moves it rearwardly. As soon as the adjusting dial 7 is turned away from the position in which the cam 98 moves the arm rearwardly, the bake circuit through the contacts just described will be reestablished, although whether current flows to the bake element depends also upon the position of the contact bars 43.

If the broil lever is in its rear position when the adjusting dial is turned to the "high" position the operating arm 80 not only opens the contacts in the bake circuit in the manner just described, but it also moves the broil lever to forward position where the contact bridge 55 comes into engagement with the contacts 54 and 54a. If the adjusting dial is turned back toward the off position the contacts in the bake circuit will again close, as the arm will be moved forward by the spring 79, and the contact bridge 55 will remain in contact with the contacts 54 and 54a. When in this position a preheating operation can be carried on.

Additional contacts are carried in the rear housing to complete the double pole switching arrangement of the device. One contact 100 is connected to a terminal 101 and a similar contact 102 is connected to a terminal 103. A contact bridge 104 carried by a lever 105 bridges these contacts and is pivoted on a projection 106 on the rear housing. The housing also carries a bracket 107 having an upwardly extending arm 108 secured thereto. A compression spring 109 extends between the arm 108 and arm 105 and normally forces the contact bridge 104 into engagement with contacts 100 and 102. A pin 111 extends between insulated extension 56 of the broil lever and a rearwardly extending arm 112 carried by the contact arm 105, a hole being provided in the contact arm 105 to permit the pin to extend therethrough. As the broil lever is moved to a position to disengage the contact bridge 55 and contacts 54 and 54a, the pin 111 moves the bridge 104 away from the contacts 100 and 102.

It should be noted that as the dial is rotated from the "off" position to a point just above the 550° mark, the dial does not move the bar 80 at all. If the dial is moved to the "high" position, then the end of the bar 80 slides along the sloping face of the cam member 98. The movement of the bar 80 by the cam operates the broil lever and the bake contact pin 90 in the manner just described. A projection 97 is provided on the cam to prevent the dial from being rotated past the "high" setting to the "off" position. The "off" position can be reached only by rotating the dial in a counter-clockwise direction. The side of the cam 98 opposite the sloping face forms a stop 96 and prevents rotation of the dial past the "off" position when rotated in a counter-clockwise direction.

This invention is more particularly directed toward the provision of means for connecting the broil element circuit to the current supply independently of rotation of the adjusting dial. To this end, separate means for actuating the bar 80 is provided. The main housing 2 is provided on the side adjacent the bar 80 with a bracket having a pair of spaced ears 113 supporting a slidable and rotatable shaft 114 exterior of the housing. Secured to the shaft beyond the ears 113 is a flanged collar 115 forming a cam element having a sloping face 116 adjoining a flat raised portion 117 which terminates on the other end in a stop 118. The shaft 114 further carries an operating member 119 for the bar 80 which is slidable thereon against the pressure of a coil spring 120 operative between the member 119 and the adjacent ear 113. The shaft is retained against withdrawal from the bracket by a pin 124 extending transversely through the end of the shaft projecting beyond the ears.

The operating member 119 comprises a flat collar carried on a bushing 126 and having a lug 121 projecting from its edge. An arm 122 extends from the operating member 119 to support an operating finger 123. The finger extends into a slot 124 formed in the bar 80 in front of the spring 80a. The projecting end of the shaft 114 is provided with a handle 125 suitably marked with the word "Broil." Thus, when the shaft is rotated counterclockwise the sloping face of the flange engages the adjacent lug 121 and pushes the operating member inwardly, compressing spring 120 and moving bar 80 longitudinally through the medium of the finger 123. The flat portion 117 engages lug 121 and serves as a holding means for retaining the bar 80 in its moved position. The operation of the bar 80 is precisely the same as if it had been moved by the cam 93 on the dial 7.

Means are provided to return the auxiliary operating means for the bar 80 to inactive position whenever the main dial 7 is moved to "off" position. An abutment 127 projects from the collar 115 on the opposite face to the raised portion 117. A bracket 128 secured to the front cover 4 is provided with a projecting lug 130 which carries a rod 129 adapted for slidable movement relative thereto. The rod 129 extends diagonally between the abutment 127 and the stop 96 on the dial 7. Thus, the stop 96 moves the rod longitudinally in one direction while the abutment 127 moves it in the other. In this manner, when the dial is moved from "off" position and the auxiliary handle 125 is operated to move the bar 80, the abutment 127 simultaneously moves the rod 129 into position to be reversely moved by the stop 96 when the dial is again brought to "off" position. Such reverse movement of the rod 129 will serve to rotate the shaft 114 permitting the operating member 119 to slide longitudinally down the sloping face 116 and thus return the bar 80 to its normal position.

If it is desired to operate the bake element only, the adjusting dial is turned from the "off" position to the desired temperature, say, 400°. Rotation of the dial will not operate to close the broil switch as the dial is not moved sufficiently far to accomplish this. The main thermostat switch will, however, close and as the contacts 86 and 89, 89a of the bake switch are normally closed, current will be supplied from the current source 13 to the bake element until the temperature reaches 400°. The diaphragm will then have expanded to a sufficient extent to operate the thermostatic lever 16 to cause the contact arm to operate the main thermostat switch and break the circuit. When the temperature of the compartment or oven drops to slightly below 400° the contraction of the diaphragm will then function to close the main thermostat switch. During an operation of this character the bake switch is constantly maintained closed.

If it is desired to use the bake element only during the cooking operation but nevertheless to bring the compartment or oven temperature rapidly up to the desired temperature, the adjusting dial is moved from the "off" position to the "high" position. This movement of the adjusting dial or handle operates to close the main thermostat switch and the broil switch. It also operates to open the bake switch. Immediately after turning the dial to the "high" position the operator turns the dial back to the desired temperature setting, say, 400°. The rotation of the dial back to this point does not disturb the broil switch but it does permit the switch in the bake circuit to close and reestablish the bake circuit.

The broil switch, the bake switch, and the main thermostat switch are all closed and the heating will continue until the desired temperature of 400° is reached. The expansion of the diaphragm will operate to open the main thermostat switch and the movement thereof will also function to open the broil switch. The bake switch is not operated at this time but remains closed. However, the current through the bake element has been interrupted by the opening of the main thermostat switch and current will not again be supplied to the bake element until the temperature drops to just below 400°, at which time the thermostat switch will close.

If it is desired to perform this preheating but to substitute low temperature broiling as the subsequent operation the adjusting dial is moved again to the "high" position and back to the desired temperature setting. As previously stated, the broil switch, bake switch and main thermostat are now closed. To open the bake switch the auxiliary handle 125 is operated, moving bar 80 inwardly for this function. Thus, the broil switch will operate under thermostat control after the preheating period.

It is often desirable to conduct a broiling operation at the same or a different temperature to a previous baking operation while the food remains in the oven. It may also be desirable to conduct a broiling operation at any temperature without a previous baking operation. With the device of this invention such operations are readily carried on. All that is required is to operate the auxiliary handle 125 while the dial 7 remains at, or is moved to, any desired temperature setting. Such operation will open the bake switch and close the broil switch which remains under control of the thermostat. When the dial 7 is returned to "off" position the stop on the back thereof will actuate the mechanism described to return bar 80 to normal position and open the broil switch.

I claim:

1. A temperature regulating device for an electric oven and the like comprising a broil element and a bake element adapted to be energized from a source of current supply through switches, said device comprising a thermostat for controlling the operation of said switches in accordance with the temperature of the oven, manual means movable to different temperature settings for adjusting said thermostat for preheating the oven and thereafter conducting a baking operation, said elements being connected simultaneously to the current supply by said manual means and said broiling element being thereafter disconnected by operation of said thermostat, said means including a control handle movable from "off" position through a maximum position to a baking temperature setting and an operating bar actuated thereby for closing the broil element switch, and auxiliary manual means for actuating said operating bar for closing said broil element switch for conducting a broiling operation while said control handle remains at said baking temperature setting.

2. A temperature regulating device for an electric oven and the like comprising a broil element and a bake element adapted to be energized from a source of current supply through switches, said device comprising a thermostat for controlling the operation of said switches in accordance with the temperature of the oven, manual means movable to different temperature settings for adjusting said thermostat for preheating the oven and thereafter conducting a baking operation, said elements being connected simultaneously to the current supply by said manual means and said broiling element being thereafter disconnected by operation of said thermostat, said means including a control handle movable from "off" position through a maximum position to a baking temperature setting and an operating bar actuated thereby for closing the broil element switch, auxiliary manual means for actuating said operating bar for closing said broil element switch for conducting a broiling operation while said control handle remains at said baking temperature setting, and interengaging means between said control handle and bar for moving said auxiliary means to open the broil switch when said handle is operated to "off" position.

3. A temperature regulating device for electric ovens and the like having broil and bake elements energized from a source of current supply, said device comprising common switch mechanism for controlling energization of the elements, separate switch mechanism for controlling energization of the broil element, separate switch mechanism for controlling energization of the bake element, said broil element being energizable in the operated condition of said broil switch mechanism and said bake element being energizable in the unoperated condition of said bake element switch mechanism, a thermostat for operating said common switch mechanism and causing alternate energizing and deenergizing of the elements to maintain selected oven temperatures, means for adjusting said thermostat to different temperature settings, means for operating both said separate switch mechanisms to the operated condition to cause energization of the broil element and simultaneous deenergization of the bake element, means effective upon said operation of the switch operating means for maintaining said broil element switch mechanism in the operated condition, means carried by said adjusting means and effective in one position of said adjusting means and operatively engageable with said switch operating means for causing said operation thereof, means effective in another position of said adjusting means for returning said bake element switch mechanism to its unoperated condition without affecting said maintaining means and thereby permitting simultaneous energization of the elements, means for connecting said broil switch mechanism and said common switch mechanism and rendering the latter effective upon deenergizing operation of said thermostat to overcome said maintaining means and cause operation of said broil element switch mechanism to unoperated condition, whereby energization of the bake element alone will occur upon subsequent energizing operation of said thermostat while said adjusting means remains in said other position, and adjusting means separate from said thermostat adjusting means and operatively engageable with said switch operating means for causing said operation thereof whenever said thermostat adjusting means is in said other position, whereby either of the elements may be separately energized to conduct bake or broil operations preceded selectively by a preheating operation if said simultaneous energization of the elements is initiated.

4. A temperature regulating device for electric ovens and the like having broil and bake elements energized from a source of current supply, said device comprising common switch mechanism for controlling energization of the elements, separate switch mechanism for controlling energization of the broil element, separate switch mechanism for controlling energization of the bake element, a thermostat for operating said common switch mechanism and causing alternate energizing and deenergizing of the elements to maintain selected oven temperatures, means for adjusting said thermostat to different temperature settings, connecting means for operating said broil switch mechanism from said common switch mechanism upon deenergizing operation of said thermostat, means for displacing said connecting means and causing operation of said broil switch mechanism for energization of the broil element irrespective of said thermostat operation, said displacing means also causing operation of said bake switch mechanism for deenergization of the bake element concomitantly with said energization of the broil element, means effective in one position of said adjusting means for operating said displacing means, biasing means for returning said bake element switch mechanism to its unoperated condition in another position of said adjusting means for simultaneous energization of the elements, adjusting means separate from said thermostat adjusting means for operating said displacing means whenever said thermostat adjusting means is in said other position, and holding means for said separate adjusting means to continue energization of the broil element and deenergization of the bake element under thermostat control.

5. A temperature regulating device for electric ovens and the like having broil and bake elements energized from a source of current supply, said device comprising bake switch mechanism biased to closed position, broil switch mechanism having an initial open position, toggle means for maintaining said broil switch mechanism in the position to which it is moved, means engageable with said switch mechanisms for joint operation thereof to reverse said positions, a thermostat operable for opening said broil switch mechanism, means for adjusting said thermostat and operable in one position for actuating said switch engaging means, said bake switch mechanism being closed under its bias in another position of said adjusting means and said broil switch mechanism being opened by said thermostat, a second adjusting means separate from said thermostat adjusting means, means movable by said second adjusting means for actuating said switch engaging means when said thermostat adjusting means is in said other position, holding means associated with said movable means for retaining said switch adjusting means in actuated position to continue the closed position of the broil switch mechanism and the open position of said bake switch mechanism under thermostat control, and interconnecting means between said second adjusting means and said thermostat adjusting means for releasing said holding means upon movement of said thermostat adjusting means from said other position.

6. A temperature regulating device for electric ovens and the like having broil and bake elements energized from a source of current supply, said device comprising common switch mechanism for controlling energization of the elements, separate switch mechanism for controlling energization of the broil element, separate switch mechanism for controlling energization of the bake element, a thermostat for operating said common switch mechanism and causing alternate energizing and deenergizing of the elements to maintain selected oven temperatures, means for adjusting said thermostat to different temperature settings, connecting means for operating said broil switch mechanism from said common switch mechanism upon deenergizing operation of said thermostat, a reciprocable member engageable with said connecting means for displacement thereof and for causing operation of said broil switch mechanism for energization of the broil element irrespective of said thermostat operation, means for operating said bake switch mechanism for deenergization of the bake element by movement of said reciprocable member, operating means carried by said adjusting means for moving said reciprocable member in one position of said adjusting means, said reciprocable member being ineffective to displace said connecting means in another position of said adjusting means and permitting return of said bake switch mechanism to unoperated condition and control of said broil switch mechanism by said thermostat, a second operating means for causing said movement of said reciprocable member when said thermostat adjusting means is in said other position, a cam element engageable with said second operating means for operating the same, adjusting means separate from said thermostat adjusting means for moving said cam into and out of engagement with said second operating means, and holding means associated with said cam element for retaining said operating means in said operated position and thereby said reciprocable member in its moved position to continue deenergization of the bake element and energization of the broil element under thermostatic control.

VICTOR WEBER.